United States Patent Office 2,906,788
Patented Sept. 29, 1959

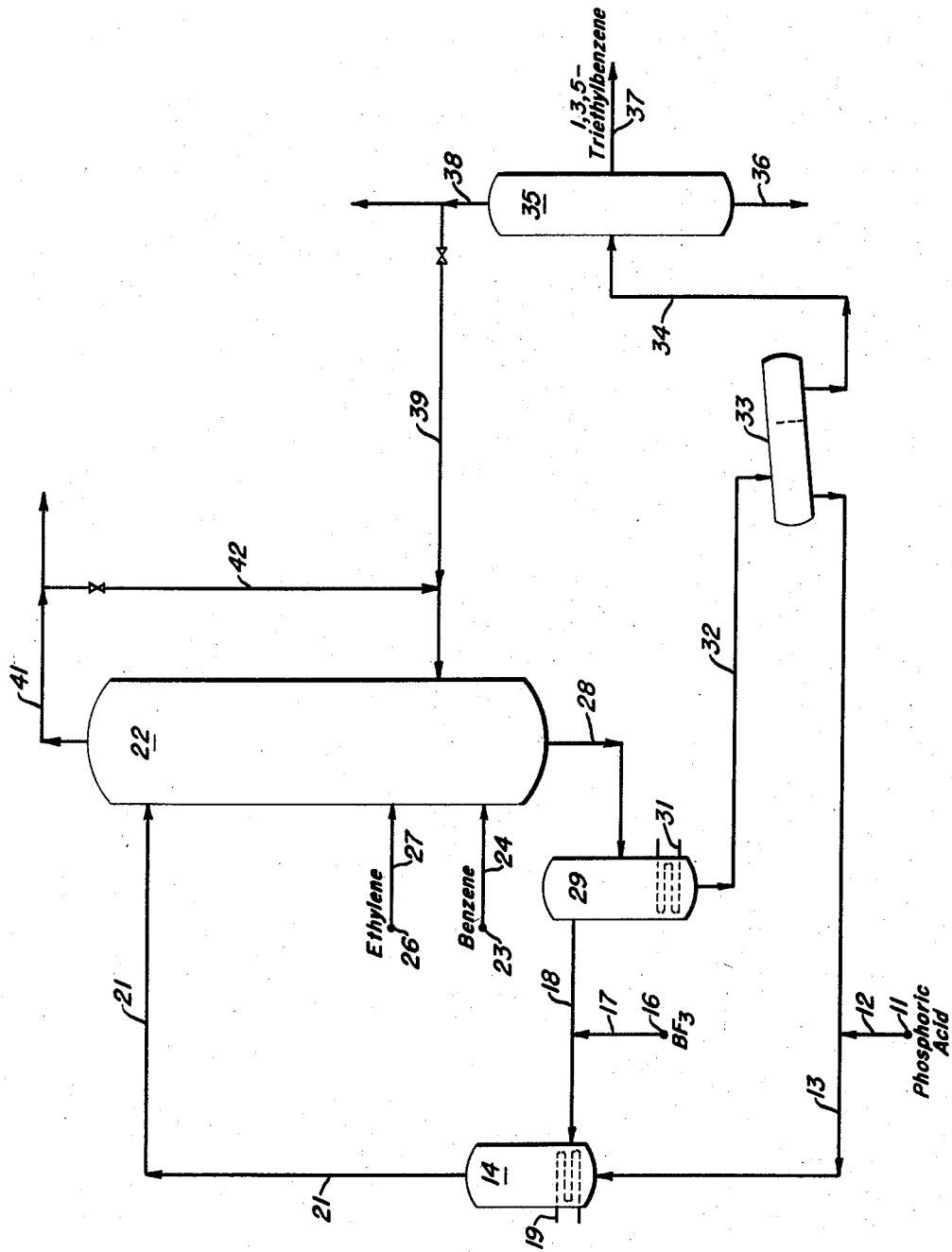

2,906,788

PRODUCTION OF TRIALKYLBENZENES BY ALKYLATION

John I. Slaughter, Beaver Dams, N.Y., and David A. McCaulay, Chicago, Ill., assignors to Standard Oil Company, Chicago, Ill., a corporation of Indiana Application December 22, 1955, Serial No. 554,774

10 Claims. (Cl. 260—671)

This invention relates to a process for the production of trialkylbenzenes, and more particularly it concerns the production of trialkylbenzenes which contain their alkyl substituents in the 1,3, and 5 positions in the benzene ring.

Polyalkylbenzenes are highly useful as intermediates in the manufacture of plastics. For instance, 1,3,5-triethylbenzene, which is substantially free of isomers containing ortho-positioned groups, can be dehydrogenated to the corresponding styrene and used in the production of high softening point resins having cross-linkages.

An object of this invention is to provide a process for producing 1,3,5-trialkylbenzenes. Another object is to provide a process for reacting benzene with olefins having from 2 to 4 carbon atoms, inclusive, in the molecule. A particular object is to provide a method and means for producing 1,3,5-triethylbenzene which is substantially free of other isomeric triethylbenzenes. Other objects of the invention will become apparent from the detailed description thereof.

It has been found that benzene can be reacted with an olefin having between 2 and 4 carbon atoms, inclusive, in the olefin molecule to produce trialkylbenzenes which have the alkyl substituents in the 1,3, and 5 positions in the benzene nucleus. The 1,3,5-trialkylbenzenes can be produced in a substantially pure form i.e. containing very little, e.g. 2% or less of its position isomers. The process is carried out by contacting the reactants in the presence of at least one volume of a phosphoric acid, having a $P_2O_5$ content of between about 60% and 83% by weight, per volume of aromatic hydrocarbon and in the presence of a $BF_3$ partial pressure of between about 50 and 5000 p.s.i.g. A reaction temperature of between about −100° F. and 300° F. is used. Surprisingly, it has been found that at a $BF_3$ partial pressure in the reaction zone of 0 p.s.i.g., no trialkylbenzenes are produced whatsoever. This is in marked contrast with the course of the reaction which occurs when $BF_3$ partial pressures of 50 p.s.i.g. and higher are maintained in the reaction zone, for under the latter conditions 1,3,5-trialkylbenzenes are produced. After the reaction has been effected, the 1,3,5-trialkylbenzenes can be recovered by removing $BF_3$ from contact with the hydrocarbons and acid and separating the acid phase from the hydrocarbon phase. The 1,3,5-trialkylbenzene can then be recovered in substantially pure form from the hydrocarbon phase by fractionation.

Because our catalyst system has selective solvent properties for 1,3,5-trialkylbenzenes, a preferred embodiment of our invention consists in separating a raffinate phase from an extract phase after the reaction has been effected. $BF_3$ is removed from the separated extract phase which causes the extracted hydrocarbons (principally 1,3,5-trialkylbenzenes and more highly alkylated benzenes) to be sprung from solution and form a separate hydrocarbon phase. This latter hydrocarbon phase will be richer in 1,3,5-trialkylbenzenes than if no separation had been made between the extract and raffinate phases. The 1,3,5-trialkylbenzenes may then be recovered by fractionation of the sprung hydrocarbon phase.

In our process for producing 1,3,5-trialkylbenzenes, benzene is reacted with an olefin. The olefin which may be used is one having between 2 and 4 carbon atoms, inclusive, in its molecule. Examples of such olefins are ethylene, propylene, butylenes, and isobutylene. While the invention is described in connection with the use of benzene, other aromatics such as toluene, xylenes, mono- and diethylbenzene as well as other mono-nuclear aromatic hydrocarbons which contain 2 or less alkyl substituents containing not more than 4 carbon atoms in the alkyl substituent may be employed.

The benzene and olefin are contacted in the presence of a phosphoric acid which has a $P_2O_5$ content between about 60% and 83% by weight. Expressed in another fashion, orthophosphoric acid having an $H_3PO_4$ content of about 85 to 115% by weight is used. This range of phosphoric acids includes orthophosphoric, pyrophosphoric, and polyphosphoric acids. Phosphoric acids containing more than 100% by weight of $H_3PO_4$ are believed to contain varying amounts of orthophosphoric, pyrophosphoric, and various chain length polyphosphoric acids. It appears that there is an equilibrium mixture of the many phosphoric acids which corresponds to a given ratio of $P_2O_5$ content. It is preferred to employ a phosphoric acid which has a $P_2O_5$ content of at least about 71 weight percent and preferably not higher than about 80 weight percent. As the $P_2O_5$ content of the phosphoric acid is increased, its viscosity increases. The phosphoric acids which have a $P_2O_5$ content higher than about 83 weight percent are so viscous as to be practically non-usable, even though the addition of $BF_3$ thereto reduced the viscosity. In order to utilize the selective solvent properties of our catalyst most advantageously it is necessary to employ a phosphoric acid which has a $P_2O_5$ content between about 71% and 80% by weight.

The phosphoric acid is employed in the amount of at least one volume of phosphoric acid per volume of benzene, generally not more than about ten volumes of phosphoric acid per volume of benzene and in the presence of a $BF_3$ partial pressure of between about 50 and 5000 p.s.i.g. The volumetric ratio of phosphoric acid to the aromatics fed to the reaction zone is generally not more than about 10:1 for economic reasons. Usually about three volumes of phosphoric acid per volume of aromatic hydrocarbon in the reaction zone will be a satisfactory ratio to use. When less than about one volume of phosphoric acid is employed per volume of aromatic in the reaction zone, the alkylation reaction proceeds only to a very small degree.

In order to obtain a substantial production of 1,3,5-trialkylbenzenes it is essential that a $BF_3$ partial pressure of at least about 50 p.s.i.g. be maintained in the reaction zone during the course of the reaction. If the $BF_3$ is employed in a partial pressure of 0 p.s.i.g. or less, there is no production of 1,3,5-trialkylbenzenes. While $BF_3$ partial pressures of 5000 p.s.i.g. may be used, it is usually not economical to employ higher $BF_3$ partial pressures because of the great increase in equipment costs. It is preferred to employ $BF_3$ partial pressures of between about 500 and 2000 p.s.i.g., for example about 1000 p.s.i.g. is satisfactory.

The temperature which is employed in carrying out the reaction may be between about −100° F. and 300° F. The operating temperature varies dependent upon the olefin which is employed in the reaction. In general the higher temperatures are employed with lower molecular weight olefins and the lower temperatures are employed with the higher molecular weight olefins. When ethylene is employed as the alkylating olefin a temperature of between 0° and 300° F., preferably between about 30° and 200° F., may be used. When propylene is employed the reaction temperature may be between −25° to 150° F. When isobutylene is used in the alkylation, temperatures of between −100° and 75° F. or thereabouts can be used.

The reaction of the aromatic with the olefin may be carried out at widely varied reaction or contact times. This time may be as short as 1 minute or as long as 25 hours. The better the mixing of the reactants and catalyst in the reaction zone, the shorter is the contact time which will be needed. Generally, the reaction proceeds more rapidly at the higher operating temperature and therefore longer contact times may be used when lower operating temperatures are employed. Usually, a contact time of between about ten minutes and five hours, for example thirty minutes, will be satisfactory. Other factors which have a bearing upon the operating temperature and contact time used are the volumetric ratio of phosphoric acid to aromatic feed and the $BF_3$ partial pressure in the reaction zone. If the volumetric ratio of phosphoric acid to feed aromatics is increased above 1.0, the contact time required may be decreased and/or the operating temperature may be decreased. Similarly if the partial pressure of $BF_3$ in the reaction zone is increased above 50 p.s.i.g., the operating temperature and/or contact time and/or volumetric ratio of phosphoric acid to feed aromatic may be decreased, provided of course, that the reaction conditions remain within the ranges specified.

The reaction is preferably carried out by introducing the olefin into a reaction zone which contains the aromatic hydrocarbon, phosphoric acid, and $BF_3$. The olefin should be introduced slowly so that no large excess of olefin will build up in the reaction zone and form undesirably large amounts of olefin polymers. Thus the olefin is preferably introduced into the reaction zone over the course of the reaction period. This may be done by continuous introduction of the olefin in preference to intermittent introduction of the olefin. In producing 1,3,5-trialkylbenzene from benzene and an olefin, approximately 3 moles of olefin are introduced per moles of benzene. Obviously if a portion of mono-alkylbenzene or dialkylbenzene is recycled to the reaction zone, less olefin is required in producing the 1,3,5-trialkylbenzene.

Our catalyst system has selective solvent properties. It is believed that it functions as a selective solvent because of certain complex formations which will be hereinafter described. $BF_3$ is readily absorbed when passed into the phosphoric acid. When $BF_3$ is passed into the phosphoric acid, $BF_3$ continues to be absorbed until about one gram mole of $BF_3$ is absorbed per the sum of the gram atoms of phosphorous plus the gram moles of uncombined water contained in the phosphoric acid. For example, if orthophosphoric acid (100% $H_3PO_4$) is employed, about 1.0 moles of $BF_3$ are necessary to saturate each mole of the $H_3PO_4$ since each mole of $H_3PO_4$ contains one atom of phosphorous and no uncombined water. With more concentrated phosphoric acids such as have a $P_2O_5$ content of 71 to 83 weight percent, the amount of $BF_3$ in the $BF_3$-saturated phosphoric acid will vary only slightly from about 41 to 43 weight percent.

If additional $BF_3$ is present (the contact zone is operated under a partial pressure of $BF_3$ of e.g. 50 p.s.i.g. or higher) the polyalkylbenzenes, especially those containing alkyl substituents substituted in the 1,3,5 positions in the benzene ring, become complexed with the phosphoric acid and $BF_3$. It is believed that the coordination compound, which consists of a mole of $BF_3$ per phosphoryl group contained in the phosphoric acid, complexes with one mole of an extractable polyalkylbenzene and an additional mole of $BF_3$ in the following fashion:

$$[P{=}O \cdot BF_3] \cdot [Polyalkylbenzene \cdot BF_3]$$

The complexes which are formed between the phosphoric acid, $BF_3$ and various polyalkylbenzenes have varying degrees of stability dependent upon the polyalkylbenzene and the partial pressure of $BF_3$ on the system. In general polyalkylbenzenes form more stable complexes when they contain a greater number of alkyl substituents in the benzene ring. Those alkylbenzenes which are substituted in the 1,3 and 1,3,5 positions form complexes which are more stable than those formed from polyalkylbenzenes having the same number of alkyl substituents but which are substituted in different positions in the benzene ring. The stability of the complex of a polyalkylbenzene with phosphoric acid and $BF_3$ is reflected by the pressure at which it dissociates. The higher the $BF_3$ pressure necessary to prevent dissociation, the less stable is the complex. By taking advantage of the differing stabilities of the complexes of various polyalkylbenzenes with phosphoric acid at varying $BF_3$ partial pressures, a number of separations between different polyalkylbenzenes can be effected.

After carrying out the reaction between the aromatic hydrocarbons and olefins for the desired length of time, the reaction products can then be recovered. The 1,3,5-trialkylbenzenes can be recovered by reducing the partial pressure of $BF_3$ which is in contact with all of the hydrocarbons and phosphoric acid. As the $BF_3$ partial pressure is reduced, the less stable complexes formed between the phosphoric acid, $BF_3$, and the polyalkylbenzenes are dissociated. The polyalkylbenzenes are thus sprung from solution in the acid phase and pass into a hydrocarbon phase. Stratification of the hydrocarbon and acid phases can be effected and the two phases separated. The 1,3,5-trialkylbenzenes can then be recovered from the hydrocarbon phase by fractionation or other suitable means. It is apparent that the $BF_3$ partial pressure may be partially reduced and the quantity of sprung hydrocarbons regulated to achieve a separation or solvent extraction effect.

A preferred method of recovering the 1,3,5-trialkylbenzenes from the reaction product employs the selective solvent properties of our catalyst system. During the course of the reaction between the aromatics and olefins, a heterogeneous mixture of liquids, as well as a gas phase, is present in the reactor. The preferred method of recovering the 1,3,5-trialkylbenzenes consists of separating the two liquid phases which are present after the reaction of the aromatic hydrocarbons with the olefins. Those two liquid phases will be termed herein as the raffinate phase (which contains $BF_3$ and non-complexed hydrocarbons) and the extract phase (which contains phosphoric acid, $BF_3$, complexed and some physically dissolved hydrocarbons). The separation of the extract phase from the raffinate phase before removing any substantial amount of $BF_3$ from the extract phase provides a means for extracting the 1,3,5-trialkylbenzenes in the extract phase. The $BF_3$ partial pressure existant in the separated extract phase may then be partially or fully reduced e.g. reduced to atmospheric pressure. This springs a hydrocarbon phase having a very high concentration of 1,3,5-trialkylbenzenes. The 1,3,5-trialkylbenzenes can then be fractionated, if desired, from the hydrocarbon phase which has been sprung from the extract phase. A very high purity 1,3,5-trialkylbenzene fraction, substantially free of other trialkylbenzenes containing alkyl substituents in different positions in the benzene ring can thus be produced.

In order to obtain the most efficient selective solvent properties of our catalyst system, the phosphoric acid which is employed should have a $P_2O_5$ content of between about 71 and 80 weight percent. If the $P_2O_5$ content is outside this prescribed range, flashing off $BF_3$ at atmospheric pressure from the extract phase will not spring any substantial amount of extracted polyalkylbenzenes, since the complex of $BF_3$, phosphoric acid, and hydrocarbons is not broken. If the $P_2O_5$ content is outside this range of 71% to 80%, it is necessary to resort to other methods for recovering extracted polyalkylbenzenes from the extract phase. For example, the extract phase may be subjected to an elevated temperature and subatmospheric pressure which removes $BF_3$ from the complex and springs the extracted components. Alternatively, the extract may be diluted with water which removes $BF_3$ from the complex and springs extracted components, although this method is less economical.

The invention will be more fully understood by reference to the following example illustrated in the annexed drawing which forms a part of this specification and shows in schematic form one embodiment of the process of this invention for producing 1,3,5-triethylbenzene from benzene and ethylene. Numerous valves, pumps, compressors, heating and cooling means, and the like have not been shown for the purpose of better clarity.

Phosphoric acid, having a $P_2O_5$ content of 78% by weight, from source 11 is passed by way of line 12 into line 13 where it meets with additional quantities of recovered and recycled phosphoric acid. It is then passed by way of line 13 into vessel 14. $BF_3$ from source 16 is passed by way of line 17 into line 18 where it meets additional quantities of recovered $BF_3$. $BF_3$ is then passed by way of line 18 into vessel 14. The catalyst is prepared in vessel 14 by introducing $BF_3$ into the phosphoric acid until a partial pressure of $BF_3$ of about 1000 p.s.i.g. is attained. Vessel 14 is provided with cooling means 19 to remove the heat formed during the saturation of the acid with $BF_3$.

The catalyst, which consists of phosphoric acid maintained under a $BF_3$ partial pressure of about 1000 p.s.i.g. is passed from vessel 14 by way of line 21 into reactor 22 at a point near the top of the reactor. Benzene from source 23 is passed by way of line 24 into reactor 22 at a point near the bottom of the reactor. Ethylene from source 25 is passed by way of line 27 into reactor 22 at a point intermediate of the introduction of the catalyst and the benzene. The catalyst travels downwardly in reactor 22 and the hydrocarbons travel upwardly therethrough, except for the highly alkylated benzenes such as 1,3,5-trialkylbenzenes which are extracted by the selective solvent action of the catalyst. A temperature of about 75° F. is maintained within the reactor. The $BF_3$ pressure is maintained at about 1000 p.s.i.g. by the addition of further amounts of $BF_3$ as may be needed. The catalyst and benzene are introduced at rates so that approximately 3 volumes of phosphoric acid are introduced per volume of benzene introduced. A contact time of approximately 4 hours is employed. Ethylene is introduced continuously into the reaction zone over the course of the contact time in the amount of about 3 moles per mole of benzene introduced (when partly alkylated benzene is recycled, the molar ratio of ethylene to benzene may be reduced to account for such operation). While more or less than 3 moles of olefin per mole of benzene can be used, for example from 0.5 to 5 moles of olefin per mole of benzene may be employed, it is preferred to use approximately 3 moles of olefin per mole of benzene in order to maximize the 1,3,5-trialkylbenzene production. In reactor 22 which is well agitated by means not shown, benzene is alkylated with ethylene to produce a substantial amount of 1,3,5-triethylbenzene together with less completely and more completely alkylated benzenes such as ethylbenzene, diethylbenzene, and hexa-ethylbenzene.

A raffinate phase containing $BF_3$ and hydrocarbons, including benzene, ethylbenzene, and diethylbenzenes which are not dissolved by the extract phase, is removed from the top of reactor 22. The heavier extract phase which contains $BF_3$, phosphoric acid, and complexed polyethylbenzenes is removed, while still subject to a partial pressure of $BF_3$ of about 1000 p.s.i.g., from the bottom of the reactor. To achieve a sharper separation during the extraction of the 1,3,5-triethylbenzene, paraffins or other inert hydrocarbons, which preferably boil outside the range of the reactants and the reaction products, may be introduced into reactor 22 wherein they scrub out physically dissolved but uncomplexed aromatics from the extract phase. When paraffins are so employed they may be introduced into reactor 22 at a point intermediate of the introduction of the reactants and the catalyst. The extract phase which is removed from the bottom of reactor 22 is then passed by way of line 28 into extract decomposer 29. $BF_3$ is flashed from the extract phase by reducing the pressure on the extract phase to atmospheric pressure. Extract decomposer 29 is provided with a heating means 31 which maintains a temperature within the decomposer of about 100° F. The flashed $BF_3$ is removed by way of line 18 and thence passed into vessel 19 for the preparation of further amounts of catalyst.

The liquid then remaining in vessel 29 is substantially all phosphoric acid and 1,3,5-triethylbenzene together with more completely alkylated benzenes which may have been formed and minor amounts of mono- and diethylbenzenes and benzene. The liquid is passed from extract decomposer 29 by way of line 32 into settler 33 wherein a heavier phosphoric acid layer is separated from a lighter layer of hydrocarbons. The phosphoric acid layer is removed from settler 33 and passed by way of line 13 into vessel 14 where it is used to prepare additional quantities of catalyst. Referring to settler 33, the lighter hydrocarbon layer is removed therefrom and passed by way of line 34 into fractionator 35. Prior to fractionation it may be purified of remaining traces of acid and $BF_3$ by means such as caustic washing, water washing, and coalescing, or other means, not shown. In fractionator 35 a heavy bottoms fraction consisting substantially of hexa-ethylbenzene with some tetra- and pentaethylbenzenes is removed by way of line 36 and passed to storage means, not shown. A side stream which consists of substantially pure 1,3,5-triethylbenzene is removed by way of line 37 and sent to storage, not shown. A low boiling fraction is removed overhead from fractionator 35 by way of line 38 and sent to storage means, not shown. This fraction will consist primarily of diethylbenzenes as well as any ethylbenzene and benzene which might become physically occluded in the extract phase. It may be recycled, if desired, by way of valved line 39 into reactor 22 for further alkylation to produce additional amounts of 1,3,5-triethylbenzene.

The raffinate phase is removed overhead from reactor 22 and passed by way of line 41 to means which are not shown herein for the recovery of $BF_3$ and hydrocarbons. Since the raffinate phase will consist of substantial amounts of $BF_3$, benzene, ethylbenzene, and diethylbenzene, and ethylene, it may be recycled completely or in part by way of valved line 42 and thence into valved line 39 by which is it returned to reactor 22. It is preferred, however, to remove the raffinate phase by way of line 41 and then recover the constituents by suitable means such as fractionation, after which the desirable constituents of the raffinate phase may be recycled to reactor 22.

Runs were performed which demonstrate the effectiveness of our invention for producing 1,3,5-trialkylbenzenes. The runs which were performed follow:

RUN NO. 1

Run No. 1 demonstrates that if $BF_3$ is not employed in a high partial pressure in the reaction zone, no 1,3,5-trialkylbenzenes are produced. In this run the catalyst was prepared by introducing $BF_3$ into phosphoric acid having a $P_2O_5$ content of 81.3% by weight until the acid was saturated with $BF_3$ under atmospheric conditions. An autoclave reactor provided with internal agitation means was used in carrying out the reaction. The phosphoric acid (saturated with $BF_3$) and benzene, in a volumetric ratio of phosphoric acid to benzene of 2:1, were mixed in the reactor and ethylene was slowly added thereto. The ethylene was added in the amount of 3.1 moles per mole of benzene in the reaction zone. Ethylene was added slowly and continuously over the course of the reaction time which was two hours. The reaction temperature was maintained at 75° F. At the conclusion of the reaction period the contents of the autoclave were passed into a vessel filled with crushed ice which had been brought to the temperature of a Dry Ice-acetone bath. The hydrocarbons separated as an upper oil layer above a lower aqueous acid layer. The oil layer was withdrawn, neutralized with aqueous ammonia, and water washed. The composition of the product in mole percent was then determined by fractionation and infrared spectrometry. The feed benzene was converted to the extent of 83% to alkylated products. The composition of the products follows:

*Product distribution, mole percent*

| | |
|---|---|
| Benzene | 17 |
| Ethylbenzene | 35 |
| Diethylbenzenes | 22 |
| Triethylbenzenes | 0 |
| Tetraethylbenzenes and higher | 26 |

RUN NO 2

This run was performed in a fashion similar to run No. 1 except that the reactor was pressured with $BF_3$ until a partial pressure of $BF_3$ of 500 p.s.i.g. was attained therein. After pressuring the reactor containing phosphoric acid with $BF_3$, the benzene was added and thereafter the ethylene was introduced. The reaction time was 90 minutes instead of the 120 minutes employed in run 1. Also, the $P_2O_5$ content of the phosphoric acid was 78.9% rather than 81.3% by weight as employed in run No. 1. In run 2 88% of the benzene feed was converted to alkylated products. The composition of the product was as follows:

*Product distribution, mole percent*

| | |
|---|---|
| Benzene | 12 |
| Ethylbenzene | 28 |
| Diethylbenzenes | 19 |
| 1,2,4-triethylbenzene | 0 |
| 1,3,5-triethylbenzene | 14 |
| Tetraethylbenzenes and higher | 26 |

By comparing the product distribution from run 2 with that from run 1, it will be noted that 1,3,5-triethylbenzene was produced only in run 2. It should further be noticed that only the 1,3,5-isomer of triethylbenzene is produced. Such a result is quite unexpected since in run No. 1 no triethylbenzene was produced. It is evident that the use of an elevated $BF_3$ partial pressure in the reaction zone is essential to produce 1,3,5-trialkylbenzenes. The present application is a continuation-in-part of S.N. 504,172, filed April 27, 1955, and issued as U.S. 2,762,750.

Although the present invention has been described with reference to specific preferred embodiments thereof, the invention is not to be considered as limited thereto but includes within its scope such modifications and variations as come within the spirit of the appended claims.

We claim:

1. A process for the production of 1,3,5-trialkylbenzenes which comprises reacting an olefin having between 2 and 4 carbon atoms, inclusive, in the olefin molecule with benzene in a reaction zone in the presence of at least one volume of phosphoric acid having a $P_2O_5$ content between about 60% and 83% by weight per volume of benzene and in the presence of a $BF_3$ partial pressure of between about 50 and 5000 p.s.i.g. at a temperature between about $-100°$ F. and 300° F., removing $BF_3$ from contact with the hydrocarbons and acid, and recovering 1,3,5-trialkylbenzenes which have been produced.

2. The process of claim 1 wherein the olefin is introduced into the reaction zone over the course of the reaction time.

3. The process of claim 1 wherein approximately three moles of olefin per mole of benzene are introduced into the reaction zone.

4. The process of claim 1 wherein the olefin is ethylene and wherein the reaction temperature is between about 30° and 200° F.

5. The process of claim 1 wherein the phosphoric acid has a $P_2O_5$ content between about 71% and 80% by weight.

6. The process of claim 5 wherein after the reaction between the benzene and olefin has been effected, a raffinate phase is separated from an extract phase, the phase separation being carried out under said $BF_3$ partial pressures, $BF_3$ is removed from the extract phase thereby forming a hydrocarbon phase and an acid phase, and recovering 1,3,5-trialkylbenzenes from the hydrocarbon phase.

7. A process for the production of 1,3,5-trialkylbenzenes which comprises introducing an olefin having between 2 and 4 carbon atoms, inclusive, in the olefin molecule into a reaction zone containing benzene, phosphoric acid having a $P_2O_5$ content between about 71% and 80% by weight, and $BF_3$; the phosphoric acid being employed in the amount of between about 1 and 10 volumes per volume of benzene and the olefin being introduced in the amount of approximately three moles per mole of benzene; maintaining the reaction zone under a partial pressure of $BF_3$ of between about 50 and 5000 p.s.i.g. and at a temperature between about $-100°$ F. and 300° F.; separating while under said partial pressure of $BF_3$, a raffinate phase from an extract phase; removing $BF_3$ from contact with the extract phase and thereby forming a hydrocarbon phase and an acid phase, and recovering 1,3,5-trialkylbenzenes from the hydrocarbon phase.

8. The process of claim 7 wherein the olefin is slowly and continuously introduced into the reaction zone over the course of the reaction time.

9. The process of claim 7 wherein the olefin is ethylene and a temperature between about 30° and 200° F. is maintained in the reaction zone.

10. The process of claim 7 wherein $BF_3$ is removed from contact with the extract phase by vaporization therefrom.

References Cited in the file of this patent

UNITED STATES PATENTS

| | | |
|---|---|---|
| 2,412,595 | Axe | Dec. 17, 1946 |
| 2,762,750 | Slaughter et al. | Sept. 11, 1956 |

OTHER REFERENCES

Topchiev et al.: Doklady Akad. Nauk. S.S.S.R., vol. 93, 1953, pp. 839–842.